(12) United States Patent
Höglund et al.

(10) Patent No.: US 7,613,668 B2
(45) Date of Patent: Nov. 3, 2009

(54) ANOMALY DETECTION SYSTEM AND A METHOD OF TEACHING IT

(75) Inventors: Albert Höglund, Helsinki (FI); Kimmo Hätönen, Helsinki (FI); Antti Sorvari, Sipoo (FI)

(73) Assignee: Nokia Siemens Networks Oy, Espoo (FI)

( * ) Notice: Subject to any disclaimer, the term of this patent is extended or adjusted under 35 U.S.C. 154(b) by 789 days.

(21) Appl. No.: 10/383,224

(22) Filed: Mar. 7, 2003

(65) Prior Publication Data

US 2003/0225520 A1    Dec. 4, 2003

Related U.S. Application Data

(63) Continuation of application No. PCT/FI01/00783, filed on Sep. 10, 2001.

(30) Foreign Application Priority Data

Sep. 11, 2000    (FI) .................................. 20001997

(51) Int. Cl.
*G06Q 10/00* (2006.01)
(52) U.S. Cl. .......................................... 706/25; 706/12
(58) Field of Classification Search ................... 705/25; 706/12, 25
See application file for complete search history.

(56) References Cited

U.S. PATENT DOCUMENTS

| | | | |
|---|---|---|---|
| 5,206,640 A * | 4/1993 | Hirvonen et al. ............ | 340/852 |
| 5,819,226 A | 10/1998 | Gopinathan et al. | |
| 5,966,650 A | 10/1999 | Hobson et al. | |
| 6,038,555 A | 3/2000 | Field et al. | |

OTHER PUBLICATIONS

"Tide", Encyclopedia Britannica article downloaded from http://www.search.eb.com/eb/article?tocId=9072409&query=tide&ct=eb, Nov. 29, 2004.*
Definitions of "presentation" and "period" from Merriam-Webster's Collegiate Dictionary accessed at http://www.search.eb.com/dictionary, Apr. 20, 2005.*
"Temporal Sequence Learning and Data Reduction for Anomaly Detection", Lane et al, ACM Transactions on Information and System Security, 2:295-331, 1999, pp. 150-158.
"An Anomaly Detection System for Computer Networks", Albert Höglund, Master of Science thesis, Helsinki University of Technology 1997, 72 pages.
Article entitled "A Computer Host-Based User Anomaly Detection System Using the Self-Organizing Map", Höglund et al, 6 Pages.
Article entitled "Computer Network User Behaviour Visualisation Using Self Organising Maps", Höglund et al, 6 Pages.

* cited by examiner

*Primary Examiner*—Donald L Champagne
(74) *Attorney, Agent, or Firm*—Squire, Sanders & Dempsey, LLP

(57) ABSTRACT

A method for teaching an anomaly detecting mechanism in a system comprising observable elements (302), at least one of which has a periodic time-dependent behaviour, the anomaly detecting mechanism comprising a computerized learning mechanism (314). The method comprises assembling indicators (304) indicating the behaviour of the elements (302) and arranging the assembled indicators such that each observable element's indicators are assigned to the same input data component. The learning mechanism (314) is taught so that the input data of the learning mechanism comprises the input data components which are based on the assembled indicators (304). Points which approximate the input data are placed in the input space. A presentation of time (420-424) is incorporated into at least one input data component wherein the presentation of time is periodic, continuous and un-ambiguous within the period of the at least one element with periodic time-dependent behaviour.

15 Claims, 3 Drawing Sheets

ANOMALY DETECTION SYSTEM AND A METHOD OF TEACHING IT

This application is a Continuation of International Application PCT/FI01/00783 filed on Sep. 10, 2001, which designated the U.S. and was published under PCT Article 21(2) in English.

BACKGROUND OF THE INVENTION

The invention relates to anomaly detection in a computer and telecommunication networks in which the concept of normal behaviour varies with time. More particularly, the invention relates especially to teaching an anomaly detection mechanism. An example of such an anomaly detection mechanism is based on self-organizing maps (SOM).

Mechanisms for detecting abnormal situations belong to one of two major categories, namely rule-based detection mechanisms and anomaly detection mechanisms. Rule-based detection mechanisms attempt to recognize certain behaviour patterns which are known to be improper. Thus, rule-based detection mechanisms have two severe limitations: they can only detect problems which have occurred before and which have been explicitly taught to the detection system or programmed into it. Anomaly detection systems (ADS), as used in this application, reverse the detection problem: they are taught what normal behaviour is, and anything deviating significantly (by a predetermined margin) from the norm is considered anomalous. ADS mechanisms are capable of detecting potentially problematic situations without explicit training of such situations. An example of an ADS is disclosed in reference 1. Thus an ADS is defined as a mechanism which is trained with normal behaviour of the target system. Accordingly, an ADS flags every significant deviation from normal as a potential anomaly. In contrast, a rule-based detection system is trained with known modes of abnormal behaviour and it can only detect the problems that have been taught to it.

Reference 1 discloses an ADS for a Unix-based computer system. The system consists of a data-gathering component, a user-behaviour visualization component, an automatic anomaly detection component and a user interface. The system reduces the amount of data necessary for anomaly detection by selecting a set of features which characterizes user behaviour in the system. The automatic anomaly detection component approximates users' daily profiles with self-organizing maps (SOM), originally created by Teuvo Kohonen. A crucial parameter of an SOM is a Best Mapping Unit (BMU) distance. The BMUs of the SOMs are used to detect deviations from the daily profiles. A measure of such deviations is expressed as an anomaly P-value. According to reference 1, the ADS has been tested and found capable of detecting a wide range of anomalous behaviour.

A problem with known SOM-based ADS mechanisms is that they are restricted to detecting problems in systems having a well-defined normal behaviour. In most telecommunication networks the concept of "normal behaviour" is, at best, vague. A network element's behaviour at peak time is very different from its behaviour at the quiet hours just before dawn. More precisely, most often it is the users who cause the variation in what is called normal. In other words, known ADS mechanisms do not readily lend themselves to detecting problems in systems or elements whose normal behaviour varies with time.

DISCLOSURE OF THE INVENTION

Accordingly, it is an object of the invention to provide a mechanism for teaching ADS mechanisms which rely on the concept of normal behaviour in a system in which the normal behaviour varies significantly with time. In this context, "significantly" means that a behaviour which is normal at certain times is to be considered anomalous at other times.

This object is achieved with a method and equipment which are characterized by what is disclosed in the attached independent claims. Preferred embodiments of the invention are disclosed in the attached dependent claims.

The invention is partially based on the idea that time is used as a component of the input data to the ADS. But it is not sufficient to include time in the input data, if time is represented as a quantity which increases linearly from a fixed start point. This is because such a presentation of time is not repeating, and the ADS would not know when a certain behaviour was normal and when anomalous. It is also not sufficient to introduce time as a periodic quantity (such as a 24-hour clock) because the daily jumps from 23:59 to 00:00 would introduce severe discontinuities to the input data.

Accordingly, the invention is also based on formulating a presentation of time which is suitable for solving the problem caused by the time-varying normal behaviour of systems such as telecommunication networks. According to the invention, the presentation of time which is used as a component of the input data is 1) periodic, 2) continuous and 3) unambiguous (within the period of the input data). A preferred example of such a presentation of time (t) is a projection to x and y components such that $x=\sin(2\pi t/L)$ and $y=\cos(2\pi t/L)$ where L is the length of the period of variation, typically 24 hours or a week. At first sight, such a two-dimensional presentation of time would seem to use both dimensions of a two-dimensional SOM map, but such SOM maps are for visualization purposes only, and inside a computer memory, an SOM map can have an arbitrary number of dimensions.

The continuity requirement for the presentation of time should be interpreted with the constraints of reality in mind, however. All digital systems have a finite resolution, which means that no presentation of time can be perfectly continuous. In addition, some memory can be saved when storing the observations by omitting some of the least significant bits of the observations, ie by quantization. For the purposes of the invention, a presentation of time is sufficiently continuous (="large-scale continuous") if it does not contain discontinuities which are large enough to affect a decision between normal and anomalous behaviour. For example, in a telecommunication network with a usage period of 24 hours, discontinuities (quantizations) of up to about 10 or 15 minutes may be considered acceptable if there are no times at which user behaviour changes so fast that a certain type of behaviour is considered normal at a certain point of time but anomalous 10 or 15 minutes later. In contrast, the presentation of time for a system which opens and closes (or radically changes its behaviour in other ways) at well-defined times must have considerably smaller discontinuities.

Some memory can be saved if it is known beforehand that changes in the behaviour of the observable elements are small and/or gradual during certain parts of the period (such as nights) and more pronounced during other parts (such as days). In such a case, the presentation of time can be such that the resolution is variable within the period. This means that one bit may represent, say, 30 minutes during the quiet parts of the period and 5-15 during the more active parts of the period.

In some cases a single period (typically 24 hours) is sufficient, but sometimes two or three nested periods may be required. For example, the presentation of time may comprise one component with a 24-hour period and another with a one-week period. For locations or situations strongly affected by seasonal changes, a third component with a one-year period may be required.

The invention is not limited to self-organizing maps but can be used with other clustering techniques such as k-means and Learning Vector Quantization.

According to a preferred embodiment of the invention, all variables (components of the input data), including the presentation of time, are scaled such that the variance of each variable is the same, preferably one.

The invention can be implemented as software routines in a computer system having access to the elements to be observed. Ideally, the inventive mechanism is comprised in a single network element, such as in an operations and maintenance centre.

BRIEF DESCRIPTION OF THE DRAWINGS

The invention will be described in more detail by means of preferred embodiments with reference to the appended drawing wherein.

DETAILED DESCRIPTION OF THE INVENTION

Figure 1:
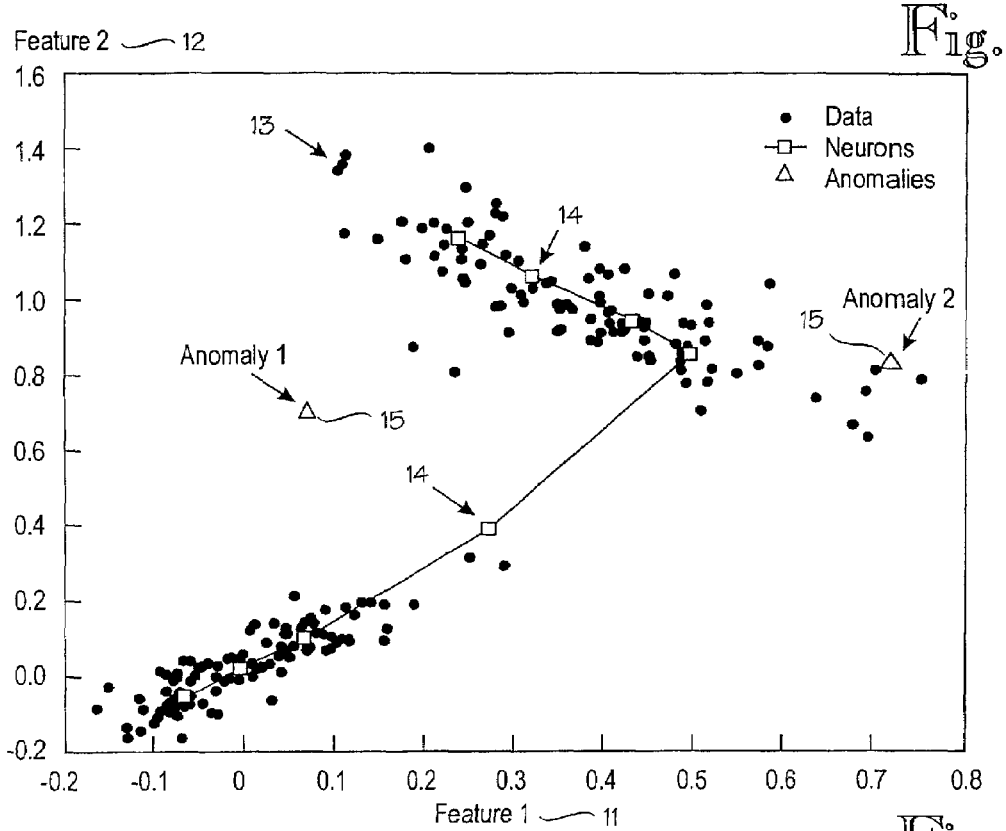
FIG. 1 shows a self-organizing map.

Preferred embodiments of the invention will be described in connection with self-organizing map (SOM) technology. FIG. 1 shows a self-organizing map. The objective with a SOM test for anomaly is to test if the current behaviour of an object is anomalous or not. The hypothesis to be tested is:

$H_0$: The most recent observation is not anomalous.
$H_1$: The most recent observation is anomalous.

The behaviour of an object can be very consistent, which means that it is concentrated to one or a couple of regions in the feature space. On the other hand, the behaviour can also be more scattered in the feature space, which would signify a more irregular behaviour. The idea of the SOM test for anomaly is to approximate the normal behaviour of an object with a small object-specific SOM. The previous behaviour is assumed to represent the normal behaviour of the object. Anomalous observations can be omitted from the previous behaviour when training the SOM.

Figure 2:
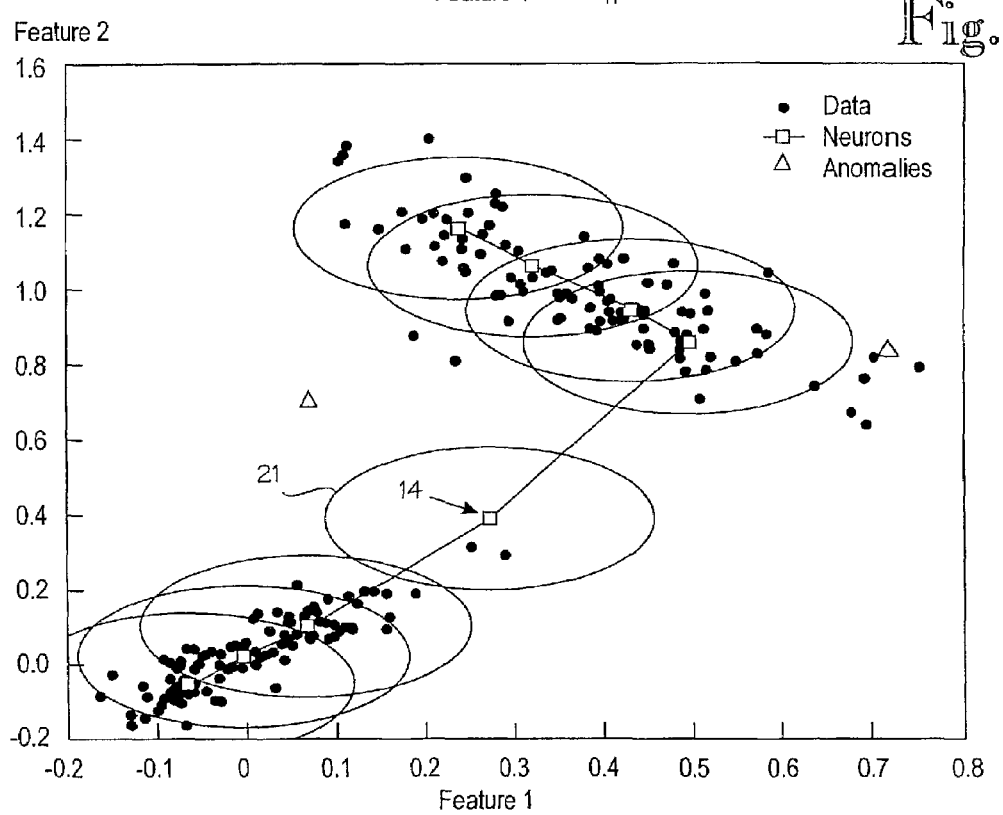
FIG. 2 is a variation of FIG. 1, with circles centred around the neurons of the SOM.

The SOM shown in FIG. 1 is a one-dimensional (8*1) SOM with 200 points of artificial data, commonly depicted by reference number 13. FIG. 2 shows the same SOM with circles or ellipses 21 plotted using the neurons 14 of the SOM as centres. For clarity, FIGS. 1 and 2 are shown with only two features 11 and 12, but in reality, the number of observable features can be much larger than two.

200 points of artificial data for two features have been plotted in the plane together with the neurons of a map of size 8*1 trained with the data. The one-dimensional SOM approximates two clusters (having four ellipses 21 each) of data quite well. Note that the data in FIG. 1 is two-dimensional to allow visualization to humans. In a computer system, the number of dimensions can be much larger than two.

The Best Matching Unit (BMU) for a data point $f_k$ in an SOM is the neuron $w_i$ having the smallest distance to the data point. This is expressed in equation (1), where dist stands for the distance.

$$\text{BMU} = arg_i \min\{\text{dist}(f_k, w_i)\} \qquad (1)$$

Here, we assume that a Euclidean distance to the BMU is used to measure how much an observation deviates from the normal object-specific behaviour, but other types of distance measurements can be used. The anomaly P-value is a measure of the degree of anomaly for an observation. On the basis of this value, the hypothesis $H_0$ is accepted or rejected. Calculation of the anomaly P-value will be described in connection with the use phase of the SOM-based ADS.

An ADS mechanism involves three major phases, design, teaching and use. The design phase typically involves human decisions and comprises the following steps:

1. Selecting a set of features describing the target object. The feature vector describing the object is denoted by f. (The target object is the object to be observed, such as a network element.) This step is described in detail in reference 1. For the purposes of the present invention, it suffices to say that the features are parameters which can be used to make a distinction between normal and anomalous behaviour.

2. Formulating a hypothesis for detecting anomalous behaviour. The objective is to test the most recent observation $f_{n+1}$ for anomaly. The hypothesis to be tested is $H_0$: The most recent observation $f_{n+1}$ is not anomalous. The alternative hypothesis is $H_1$: The most recent observation $f_{n+1}$ is anomalous. (The suffix n will be described in connection with the use phase.)

The teaching phase typically comprises the following steps:

1. Observing normal behaviour of the target object. For example, n measurements $(f_1, f_2, \ldots, f_n)$ of the feature vector are collected.

2. Training an SOM with m neurons using the measurements $(f_1, f_2, \ldots, f_n)$ as training data. The number of neurons in the map, m, is selected to be much smaller than n, for example n/10.

The use phase typically comprises the following steps:

1. Omitting neurons in the SOM that are not Best Mapping Units (BMU) for any of the data points $(f_1, f_2, \ldots, f_n)$.

2. Calculating the BMU distances-for $(f_1, f_2, \ldots, f_n)$ from the trained SOM. These distances are denoted by $(D_1, D_2, \ldots, D_n)$.

3. Calculating the BMU distance for the observation $f_{n+1}$. This distance is denoted by $D_{n+1}$.

4. Calculating the anomaly P-value. Let B be the number of the Best Mapping Unit distances $(D_1, D_2, \ldots, D_n)$ higher than $D_{n+1}$. The anomaly P-value for a certain object is then calculated from:

$$P_{n+1} = \frac{B}{n} \qquad (2)$$

5. Accepting or rejecting the null hypothesis on the basis of the anomaly P-value. If the anomaly P-value is higher than the anomaly P-value threshold, the null hypothesis $H_0$ is accepted (the most recent observation is considered normal). If, on the other hand, the anomaly P-value is smaller than the anomaly P-value threshold, the null hypothesis $H_0$ is rejected and the most recent data point is assumed anomalous.

If the test indicates that the object behaviour is anomalous ($H_0$ is rejected), the k most significantly deviating features can be determined. The k features (components of the feature vector) with the biggest absolute contribution to the BMU distance are the k most significantly deviating features. Equation (3) shows how the most deviating feature can be calculated. This component of the feature vector is given the sub-index md in equation (3). In equation (3) BMU stands for the Best Mapping Unit of the feature vector $f_{n+1}$, and j takes values from zero to the number of features. The other k-1 most deviating features are calculated in a corresponding manner.

$$f_{n+1,md} = arg_j \max\{abs(f_{n+1,j} - BMU_j)\} \qquad (3)$$

The situation shown in FIG. 1 can be used as an example. FIG. 1 shows two anomalies, commonly depicted with reference numeral 15. The anomaly P-value for anomaly 1 is 0/200=0. Since none of the BMU distances for the data points have a BMU distance greater than that of anomaly 1, the value of the numerator is zero. Correspondingly, the anomaly P-value for anomaly 2 is 7/200=0.035.

If the Anomaly P-value is smaller than the Anomaly P-value threshold, the null hypothesis $H_0$ is rejected and an alarm is triggered. The Anomaly P-value threshold can be interpreted as the fraction of observations that will be rejected if the behaviour of the monitored object does not deviate from the the same object's earlier behaviour which was used during the teaching phase. That is, if the null hypothesis is true:

number of alarms=P-value threshold*observations (4)

On the other hand, if the null hypothesis is not true (the new data is anomalous), the number of rejections (alarms) is higher.

FIG. 2 shows how a selected P-value threshold can be illustrated for object i using d-dimensional spheres (d-spheres) centred at the neurons of the object-specific map. With two-dimensional input data, the d-spheres are circles. Here d stands for the number of dimensions in the input data $(f_1, f_2, \ldots, f_n)$. In other words, each input data element $f_1$ through $f_n$ is itself a vector with d dimensions. The number of observations for object i falling outside the spheres corresponds to the numerator B in equation (2). The two-dimensional example in FIG. 2 shows such a situation. Here B is 13, which corresponds to quite high a P-value threshold of about 6.50.

Figure 3:
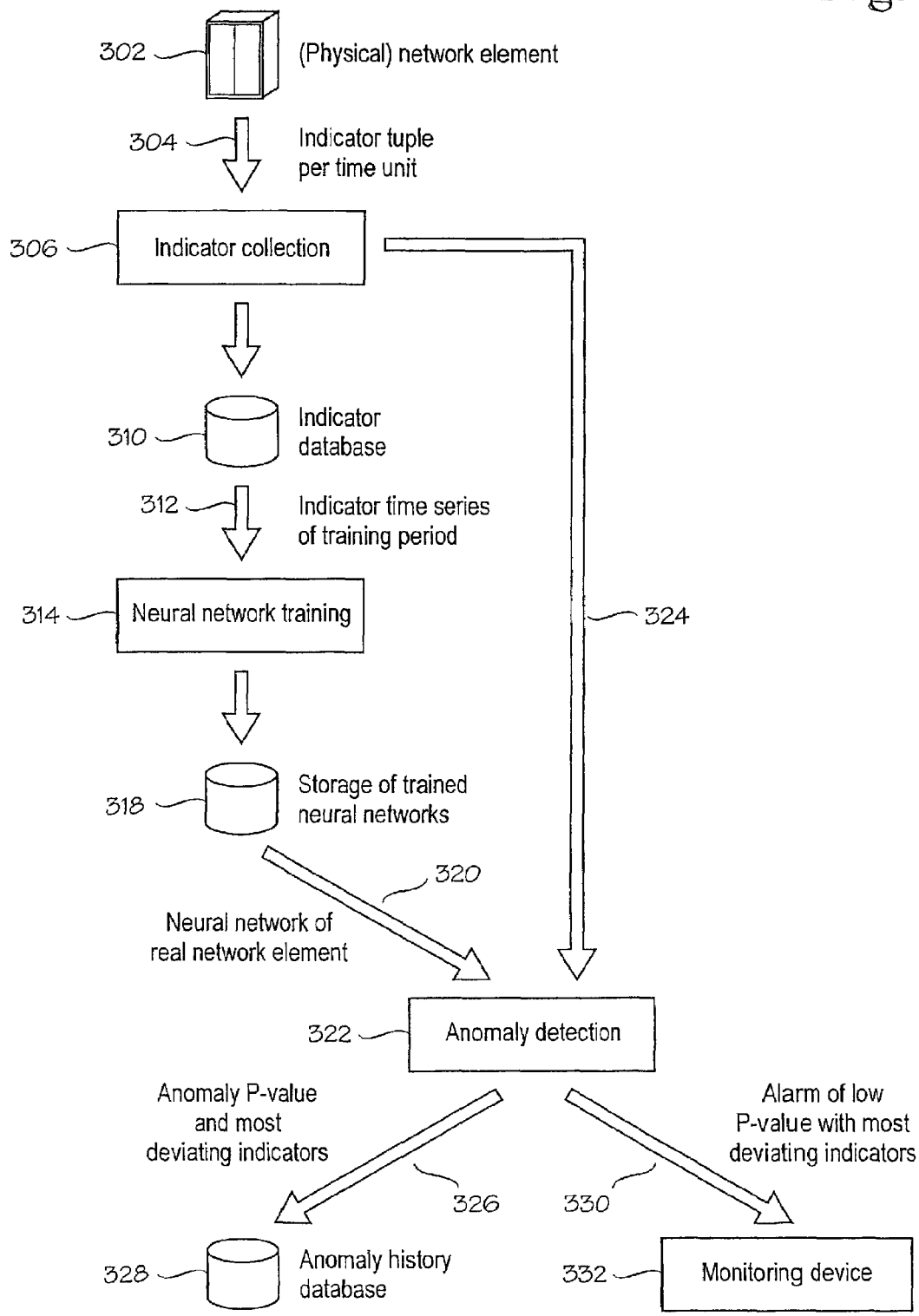
FIG. 3 is a process chart illustrating a preferred embodiment of the invention.

FIG. 3 is a process chart illustrating a preferred embodiment of the invention. Reference number 302 points to an element of a physical system such as a telecommunication network (as distinguished from a neural network). A physical element may comprise several observable elements. For example, if the physical system element 302 is a telecommunication exchange, its observable elements may comprise throughput, waiting time, number (or percentage) of failed calls and the like. For each unit of time, an indicator collector 306 collects an indicator tuple 304. The tuples are stored in an indicator database 310. Reference 312 points to a data set used for training the neural network (or another learning mechanism) 314. The data set 312 should indicate normal behaviour of the physical element 302. A storage 318 contains trained neural networks. When a physical element 302 is to be observed, the corresponding trained neural network 320 is retrieved from the storage 318 and applied as one input to the anomaly detection mechanism 322. The anomaly detection mechanism's other input is the indicator set 324 to be tested for anomalous behaviour. If the anomaly detection mechanism 322 decides that the behaviour described by the indicator set 324 is anomalous, the anomaly P-value and the most deviating indicators 326 are stored in an anomaly history database 328. At the same time, an alarm 330 is given to a monitoring device 332, such as a computer screen.

Figure 4A:
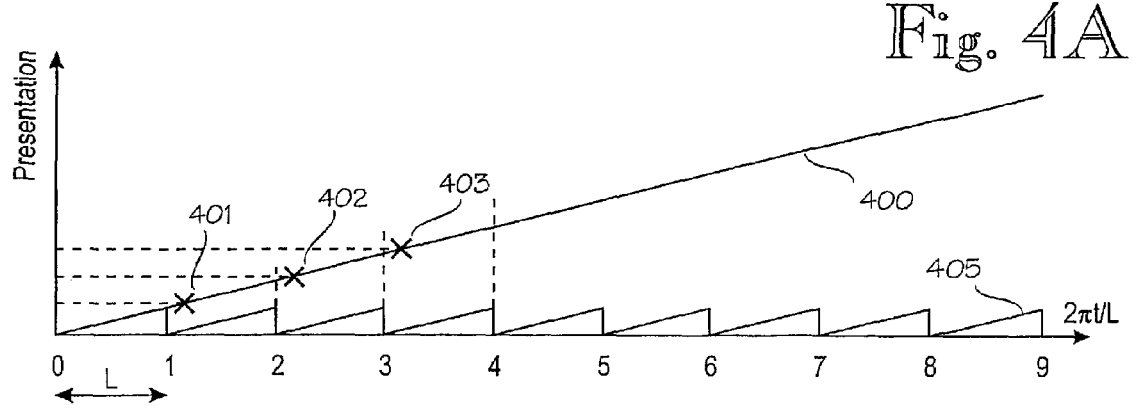
FIG. 4A to 4C illustrate different presentations of time.
Figure 4B:
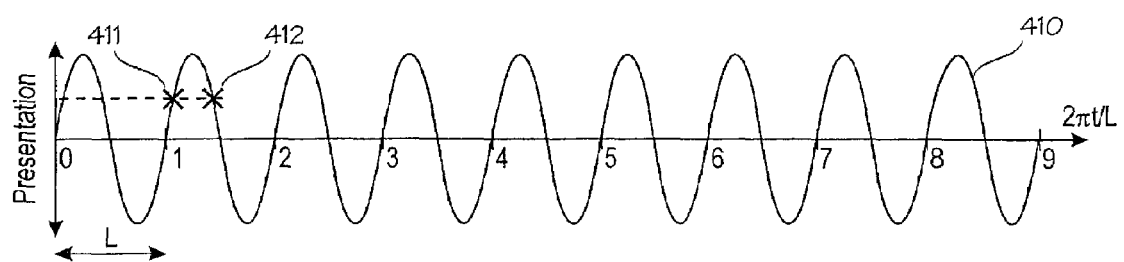
Figure 4C:
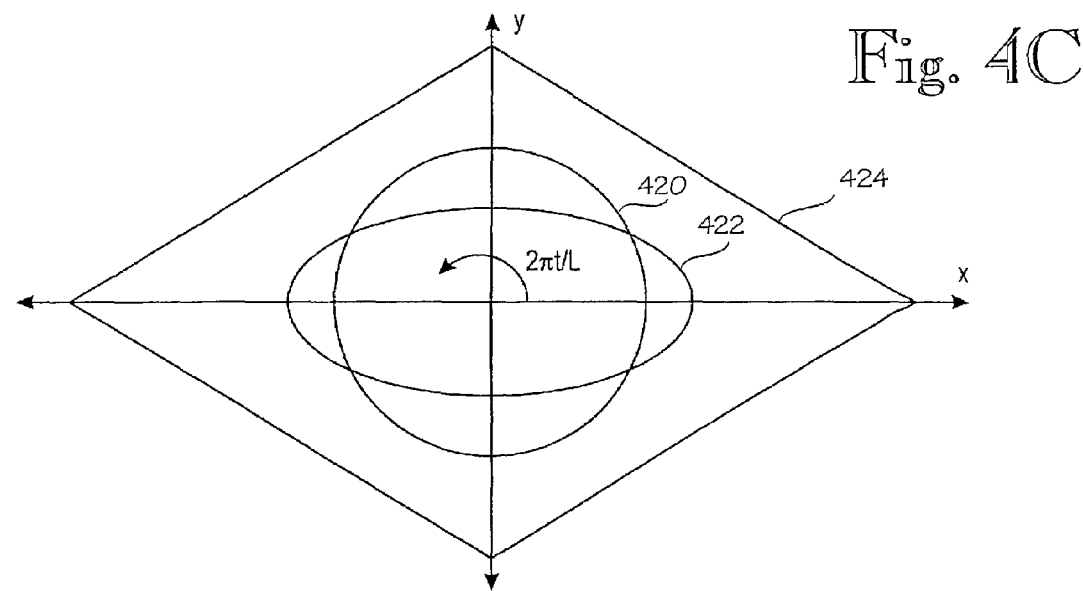

FIGS. 4A to 4C illustrate different presentations of time, some of which are acceptable and some unacceptable. In FIG. 4A, the horizontal axis is the time in units of L where L is the period of input data, which is assumed to be 24 hours. Line 400 shows a straight presentation of time. References 401 to 403 point to three instances of a repeating event which occurs at 24-hour intervals. A problem with this presentation of time is that the presentations of the times are different, and the ADS cannot recognize events 401 to 403 as a recurring event.

The saw-tooth line 405 is a 24-hour presentation of time, or in other words, a modulo function of time. In this presentation, events occurring at the same time each day have identical representations, but the day changes introduce discontinuities into the input data.

In FIG. 4B, the sine wave 410 is periodic and continuous, but it is not ambiguous. Events 411 and 412 occur at different times but have identical presentations of time. Assuming that event 411 was normal in the morning, the ADS would not recognize a similar event as an anomaly if it occurred in the evening.

FIG. 4C shows three acceptable presentations of time. They are all based on the idea that time is represented as a coordinate pair x,y. The circle 420 represents time as $\{x=\sin(2\pi t/L); y=\cos(2\pi t/L)\}$ where L is the length of the variation period; and $2\pi t/L$ is an angle from the x axis. The ellipse 422 is also acceptable as long as it is not too flat to introduce an ambiguity as to whether a point is on the top half or the bottom half of the ellipse. Even a rectangle 424 can be used. Although several points have identical x or y coordinates, no two points of the rectangle have identical x/y coordinate pairs.

The sine/cosine combination of the circle 420 is considered a preferred presentation of time because events which are equidistant in time are also equidistant in the presentation of time. However, the sine/cosine combination may be computationally intensive, and some approximations, such as a pair of triangular wave functions with a 90-degree phase shift, can be used.

As stated earlier, in some situations the presentation of time may require more than one component. For example, there may be up to three sine/cosine pairs with periods of 24 hours, one week and one year.

Although preferred embodiments of the invention have been described in connection with neural networks and self-organizing maps, the invention is not limited to these examples. As an alternative, the invention can be generalized to other clustering techniques such as k-means and Learning Vector Quantization, in which case the neurons are replaced by codebook vectors.

REFERENCE

1. Höglund, Albert: *An Anomaly Detection System for Computer Networks*, Master of Science thesis, Helsinki University of Technology 1997

Reference 1 is incorporated herein by reference.

We claim:
1. A method, comprising:
assembling indicators indicating behaviour of observable elements in a system and arranging the assembled indicators such that each indicator corresponding to each observable element is assigned to the same input data component, wherein at least one of the observable elements has a periodic time-dependent behaviour;

programming a computerized learning mechanism of an anomaly detecting mechanism in the system such that input data of the learning mechanism comprises input data components which are based on the assembled indicators, and wherein the learning mechanism comprises an input space to define the input data comprising the input data components;

placing points which approximate the input data in the input space; and incorporating a presentation of time into at least one input data component, wherein the presentation of time is periodic, continuous and unambiguous within a period of the at least one element with periodic time-dependent behaviour, and wherein the programmed computerized learning mechanism is configured to detect an anomaly in the system.

2. A method according to claim 1, wherein the learning mechanism is or comprises a self-organizing map.

3. A method according to claim 1, wherein the presentation of time has a first period and at least one second period which is a multiple of the first period.

4. A method according to claim 1, further comprising:
scaling the input data components such that each component has the same variance, preferably one.

5. A method according to claim 1, wherein the presentation of time has a variable resolution such that one bit corresponds to different units of time depending on changes in the time-dependent behaviour.

6. A system, comprising:
a computerized learning mechanism comprising an input space for defining input data comprising input data components;

means for assembling indicators indicating behaviour of observable elements in a system and arranging the assembled indicators such that each indicator corresponding to each observable element is assigned to the same input data component, wherein at least one of the observable elements has a periodic time-dependent behaviour;

means for programming the learning mechanism such that the input data of the learning mechanism comprises the input data components which are based on the assembled indicators;

means for placing points which approximate the input data in the input space; and at least one input data component comprising a presentation of time to detect anomalies in the system, wherein the presentation of time is periodic, continuous and unambiguous within the period of the at least one element with periodic time-dependent behaviour, and wherein the programmed computerized learning mechanism is configured to detect an anomaly in the system.

7. A system according to claim 6, wherein the learning mechanism is or comprises a self-organizing map.

8. A system according to claim 6, wherein the presentation of time has a first period and at least one second period which is a multiple of the first period.

9. A system according to claim 6, wherein the system is comprised in a single network element.

10. A computer readable medium with a computer program embodied thereon, the computer program being configured to control a processor to perform:

setting up an input space for defining input data comprising input data components;

receiving indicators indicating behaviour of observable elements in a system and arranging the assembled indicators such that each indicator of each observable element is assigned to the same input data component, wherein at least one of the observable elements has a periodic time dependent behaviour;

programming a computerized learning mechanism of an anomaly detecting mechanism in the system such that input data of the learning mechanism comprises input data components which are based on the assembled indicators;

placing points which approximate the input data in the input space; and incorporating a presentation of time into at least one input data component, wherein the presentation of time is periodic, continuous, and unambiguous within a period of the at least one element with periodic time-dependent behaviour, and wherein the programmed computerized learning mechanism is configured to detect an anomaly in the system.

11. A system, comprising:
a computerized learning mechanism configured to comprise an input space to define input data comprising input data components;

an assembling unit configured to assemble indicators indicating behaviour of observable elements in a system and arranging the assembled indicators such that each indicator corresponding to each observable element is assigned to the same input data component, wherein at least one of the observable elements has a periodic time-dependent behaviour;

a programming unit configured to program the learning mechanism such that the input data of the learning mechanism comprises the input data components which are based on the assembled indicators;

a placing unit configured to place points which approximate the input data in the input space; and at least one input data component comprising a presentation of time to detect anomalies in the system, wherein the presentation of time is periodic, continuous and unambiguous within the period of the at least one element with the periodic time-dependent behaviour, and wherein the programmed computerized learning mechanism is configured to detect an anomaly in the system.

12. A system according to claim 11, wherein the learning mechanism is or comprises a self-organizing map.

13. A system according to claim 11, wherein the presentation of time has a first period and at least one second period which is a multiple of the first period.

14. A system according to claim 11, wherein the system is comprised in a single network element.

15. A computer readable medium with a computer program product comprising a program code embodied thereon, said program code being configured to control a processor to perform:

setting up an input space for defining input data comprising input data components;

receiving indicators indicating behaviour of observable elements in a system and arranging the assembled indicators such that each indicator of each observable element is assigned to the same input data component, wherein at least one of the observable elements has a periodic time dependent behaviour;

programming a computerized learning mechanism of an anomaly detecting mechanism in the system such that input data of the learning mechanism comprises input data components which are based on the assembled indicators;

placing points which approximate the input data in the input space; and incorporating a presentation of time into at least one input data component, wherein the presentation of time is periodic, continuous, and unambiguous within a period of the at least one element with periodic time-dependent behaviour, and wherein the programmed computerized learning mechanism is configured to detect an anomaly in the system.

* * * * *